United States Patent [19]
Hamaue

[11] Patent Number: 5,221,110
[45] Date of Patent: Jun. 22, 1993

[54] SENSOR FOR VEHICLE SEAT BELT SYSTEMS

[75] Inventor: Tetsuya Hamaue, Shiga, Japan

[73] Assignee: Takata Corporation, Tokyo, Japan

[21] Appl. No.: 905,909

[22] Filed: Jun. 29, 1992

[30] Foreign Application Priority Data

Jun. 28, 1991 [JP] Japan .................. 3-184085

[51] Int. Cl.$^5$ ............................................ B60R 22/40
[52] U.S. Cl. .................................. 280/806; 297/480;
116/203; 116/283
[58] Field of Search .................. 280/806; 297/480;
116/203, 281, 283; 200/61.45 R, 61.53; 180/282

[56] References Cited

U.S. PATENT DOCUMENTS

| | | | |
|---|---|---|---|
| 3,372,777 | 3/1968 | Filippi et al. | 297/480 X |
| 4,913,497 | 4/1990 | Knabel et al. | 297/480 |
| 5,169,173 | 12/1992 | Nishizawa | 280/806 |

FOREIGN PATENT DOCUMENTS 57-90159  6/1982  Japan .
58-206765 12/1983  Japan .
63-35017   9/1988  Japan .
1-164650   6/1989  Japan .

*Primary Examiner*—Tamara L. Graysay
*Attorney, Agent, or Firm*—Brumbaugh, Graves, Donohue & Raymond

[57] ABSTRACT

A sensor for seat belt systems comprises a casing, an inertia body having at least a portion received in the casing for displacement axially thereof, and an output member received in the casing for displacement axially thereof and having a portion extending out of the casing so that displacement of the output member is transmitted to the outside of the casing. A set spring engaged between the casing and the inertia body biases the inertia body to a set position in the casing, and an actuator spring engaged between the casing and the output member biases the output member in a direction to displace it along the casing. A latch mechanism composed of two pairs of levers arranged in series and engaged between the output member and the inertia body prevents displacement of the output member in the absence of displacement of the inertia body in response to acceleration in excess of a predetermined acceleration.

1 Claim, 3 Drawing Sheets

SENSOR FOR VEHICLE SEAT BELT SYSTEMS

BACKGROUND OF THE INVENTION

The present invention relates to a mechanical sensor for vehicle seat belt systems and, in particular, to a mechanical sensor for operating a spring-type seat belt pretensioner.

The seat belt systems with which some vehicles are equipped have belt pretensioners for applying a preload to the belt to pull it tightly against the occupant's body and more securely restrain the occupant in the seat in the event of a collision. Some belt pretensioners are associated with the belt retractor and operate by rotating the retractor reel in the belt-winding winding direction to tighten the belt. Other pretensioners pull down on the buckle to which the seat belt is fastened. Still other types of pretensioners form a loop in the belt or wind a segment of the belt onto a spool at a point between the buckle and the retractor. All types of pretensioners require a power source, and it is known to use either a piston/cylinder operated by detonation of gunpowder or a mechanical spring.

When the power source is of a type that uses gunpowder, an electrical trigger is usually used to ignite the gunpowder. Such systems are costly to make and install. There are advantages to pretensioners based entirely on mechanical components, i.e. springs as power sources and mechanical sensors to cause the release of the spring.

When a spring is used as a power source, it must produce a large force and operate through a relatively long stroke in order to pretension the belt extremely rapidly and tighten it enough to provide the desired pretension. A mechanical sensor for releasing the trigger mechanism must likewise provide a high releasing force and do so very rapidly.

Mechanical sensors of various designs have been proposed; examples are found in Japanese Utility Model Laid-open Publications No. 57-90159 and No. 58-33060 (Japanese Utility Model Publication No. 63-35017) and Japanese Patent Laid-open Publications No. 58-206765, No. 1-164650 and No. 1-164651. The sensors disclosed in the aforementioned publications comprise inertia bodies that directly engage a trigger that holds the spring in the set condition and upon movement by an inertial force operate the trigger to release the actuator spring of the pretensioner. In order to obtain a sufficiently high output force to operate the trigger, the inertia bodies in previously known sensors must have very large masses, which requires that they be of large size and high weight. Moreover, because the sensor is incorporated into the pretensioner in these known devices, it is subject to vibrations and other movements of the pretensioner, which must be taken into account in determining a suitable location for the use of such sensors. For example, it may not be suitable to use such sensors when the pretensioner is installed on a vehicle seat.

SUMMARY OF THE INVENTION

One object of the present invention is to provide a mechanical sensor for vehicle seat belt systems that provides a high output force but has a relatively small and lightweight inertia body. Another object is to provide a sensor that has a high response speed. Yet another object is to provide a mechanical sensor having excellent anti-vibration properties, thereby making it suitable for use in various locations in the vehicle. It is also desired to be able to install the sensor remote from the pretensioner.

The foregoing and other objects are attained, in accordance with the present invention, by a sensor that comprises a casing, an inertia body having at least a portion received in the casing for displacement axially thereof, and an output member received in the casing for displacement axially thereof and having a portion extending out of the casing so that displacement of the output member is transmitted to the outside of the casing. A set spring engaged between the casing and the inertia body biases the inertia body to a set position in the casing, and an actuator spring engaged between the casing and the output member biases the output member in a direction to displace it along the casing.

A latch mechanism prevents displacement of the output member in the absence of displacement of the inertia body in response to acceleration in excess of a predetermined acceleration. The latch mechanism includes a pair of first levers and a pair of second levers, the levers of each pair being pivotally mounted in the casing symmetrically opposite each other. In the set position of the inertia body, the pairs of levers are engaged in series between the output member and the inertia body, each first lever having one arm engaged by the output member and the other arm engaging one arm of a second lever and each second lever having its other arm in engagement with the inertia body. When the inertia body is displaced in response to acceleration, the levers are released from series engagement between the output member and the inertia body, and the actuator spring displaces the output member.

In a sensor according to the present invention, the output member, upon being released from its set condition, is rapidly moved by the biasing force of the actuator spring, which may be suitably high to operate the trigger of the pretensioner or some other component of a safety belt system. The inertia body, accordingly, does not have to act directly on the trigger but instead holds the output member against displacement by acting through the latch mechanism. The two pairs of levers that latch the output member in the set condition provide a large reduction in the force transmitted by the actuator spring to the inertia body, and the inertia body can, therefore, be relatively small in size and light in weight.

For a better understanding of the invention, reference may be made to the following description of an exemplary embodiment, taken in conjunction with the accompanying drawings.

DESCRIPTION OF THE EMBODIMENT

Figure 1:
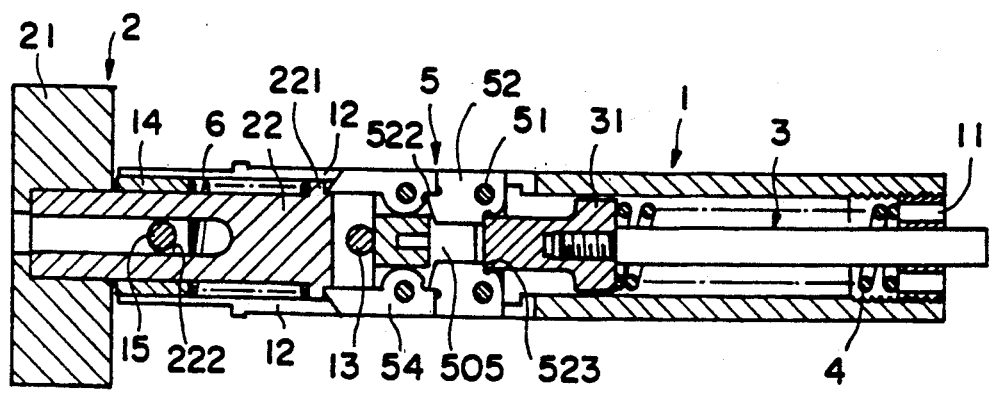
FIG. 1 is a side cross-sectional view of the embodiment, taken along a diametrical plane.

The sensor shown in the drawings comprises a casing 1, an inertia body 2 having a stem portion 22 received in the casing for displacement axially thereof and a body portion 21 screwed onto the stem portion and located outside the casing, and an output member 3 received in the casing for displacement axially thereof and having a portion extending out of the casing so that displacement of the output member is transmitted to the outside of the casing. A set spring 6 engaged between the casing 1 and the inertia body 2 biases the inertia body to a set position in the casing, and an actuator spring 4 engaged between the casing 1 and the output member 3 biases the output member in a direction to displace it along the casing.

A latch mechanism 5 prevents displacement of the output member 3 under the bias of the actuator spring 4 in the absence of displacement of the inertia body 2 in response to acceleration in excess of a predetermined acceleration. The latch mechanism 5 includes a pair of first levers 52 and a pair of second levers 54, the levers of each pair being pivotally mounted in the casing symmetrically opposite each other. In the set position of the inertia body (FIG. 1), the pairs of levers 52 and 54 are engaged in series between the output member 3 and the inertia body 2, each first lever 52 having one arm engaged by the output member 3 and the other arm engaging one arm of a second lever 54 and each second lever 54 having its other arm in engagement with the inertia body 2. When the inertia body 2 is displaced in response to acceleration, the levers 52 and 54 are released from series engagement between the output member 3 and the inertia body 2, and the actuator spring 4 displaces the output member 3.

Figure 2:
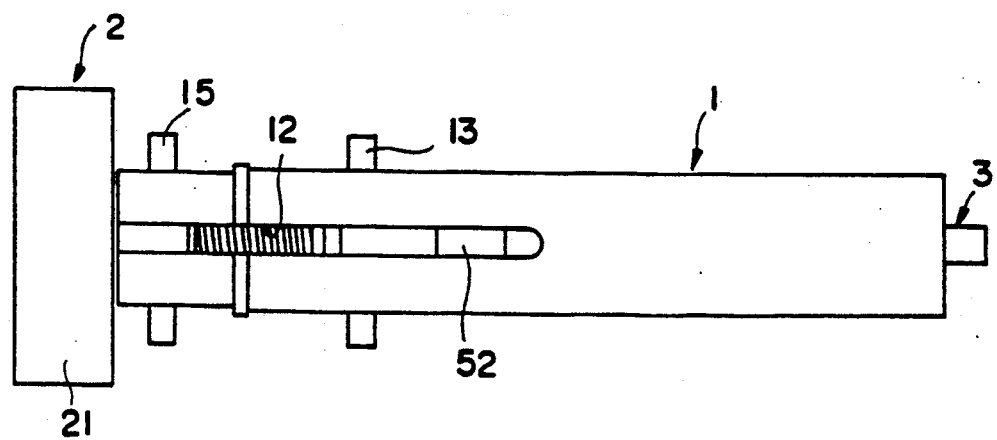
FIG. 2 is a top plan view of the embodiment.
Figure 4:
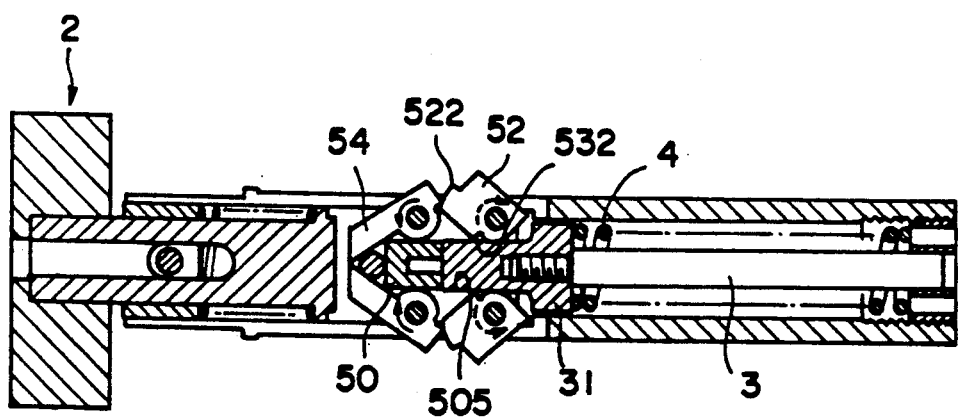
FIG. 4 is also a side-cross-sectional view, taken along a diametrical plane, but shows the sensor after it is operated.

The front portion of the casing 1 has a pair of diametrically opposite, lengthwise slots 12, which enable the latch mechanism 5 to be slid into the casing from the front end when the sensor is assembled. (For convenience, the left end of the sensor, as shown in FIGS. 1, 2 and 4, will be referred to as the front end, which is the direction in which the inertia body is displaced in response to a high acceleration.) The set spring 6, which is a relatively low-force coil compression spring, is engaged between a flange 221 on the inertia body and a spring retainer 14 that is received in the front portion of the casing and is held in place by a cross-pin 15 that passes through holes in the casing and in the retainer 14. The stem 22 of the inertia body has a lengthwise transverse slot 222, which enables the inertia body to slide forwardly against the bias of the set spring 6 when the sensor operates, as described below. In the set condition (FIG. 1), the outer circumference of the rear end of the stem 22, rearwardly of the flange 221, is engaged at diametrically opposite locations by the tips of the front arms of the levers 54, and the flange 221, by engaging the tips of the levers 54, establishes the rearward position of the inertia body in its set condition.

The rear portion of the casing receives the output member 3 and the actuator spring 4. The actuator spring is engaged under compression between a rear retainer 11, which screws into the rear end of the casing, and a front retainer 31, which is screwed onto the front end of the output member 3. The front end of the retainer 31 engages a shoulder 523 on one arm of each of the levers 52, which engagement establishes the forward position of the output member in the set condition.

Figure 3:
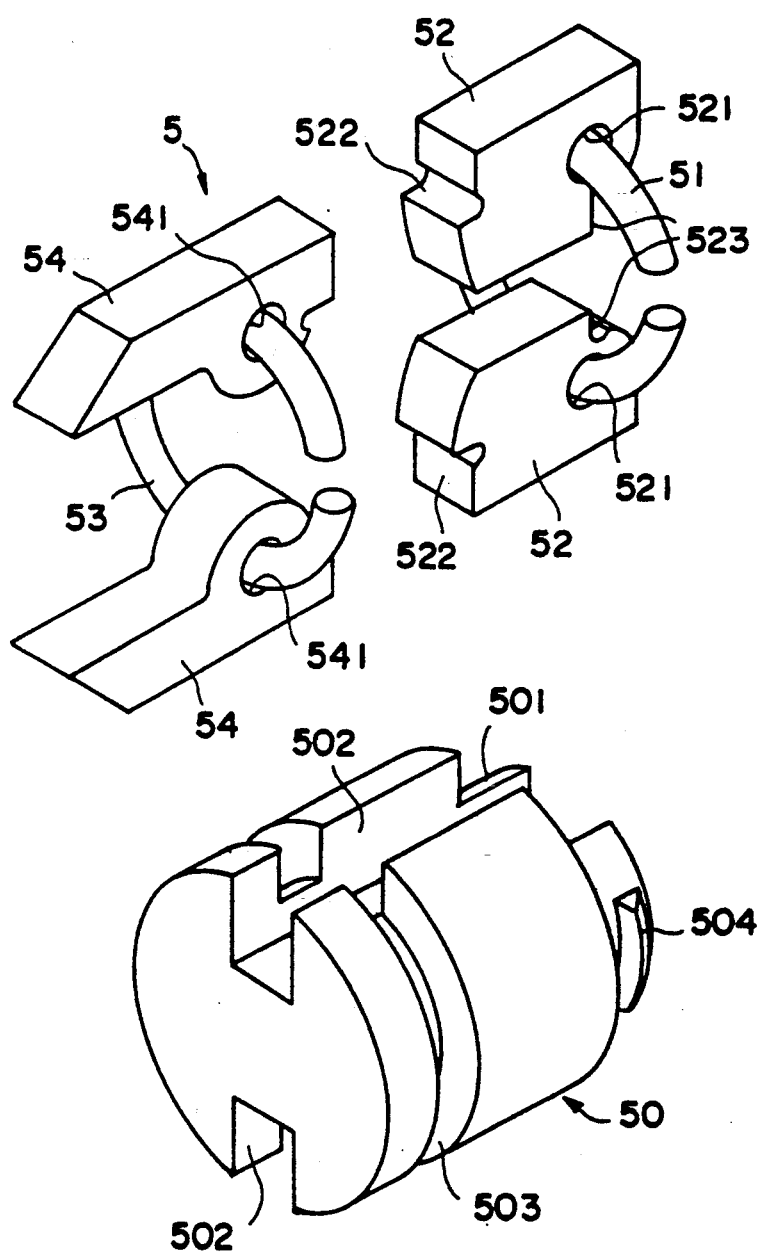
FIG. 3 is an enlarged, exploded pictorial view of the latch mechanism.

As shown in FIG. 3, the levers 52 and 54 of the latch mechanism are received in lengthwise slots 502 in a support block 50 and are retained by C rings 51 and 53 that pass through holes 521 and 541 in the respective levers 52 and 54 and are received in circumferentially extending grooves 501 and 503 in the block 50. Stop protrusions 504 formed on a reduced diameter portion of the block form the groove 501 for the ring 51. The C rings 51 and 53 are the pivot mountings of the levers. The block 50 has a hole 505 (FIG. 1) extending axially partway through it from the rear end, which receives the front end of the spring retainer 31 and is deep enough to allow the retainer to move forward when the sensor operates. The block 50 is held in place in the casing by engaging at its rear end a shoulder on the inside of the casing 1 between the rear portion, which is of lesser diameter, and the larger diameter front portion, and by engaging at its front end a cross pin 13 that passes through holes in the casing 1.

In the set condition, the biasing force stored in the actuator spring 4 acts on the spring retainer 31 of the output member 3, which in turn transmits the force to the rear arms of the levers 52 at the shoulders 523. The force is such as to tend to rotate the levers 52 in a direction to pivot their front arms outwardly, with respect to the block 50. The front arms of the levers 52 have shoulders 522 that engage the rear arms of the levers 54 such as to tend to pivot the levers 54 in a direction to move their front arms inwardly, with respect to the block. Because the front arms of the levers 54 engage the rear end of the stem 21, the lever 54 are prevented from pivoting under the forces transmitted to them by the levers 52.

The rear arms of both pairs of levers 52 and 54 are shorter than the front arms. Accordingly, the forces transmitted by them are successively reduced, such that the forces exerted by the front arms of the levers 54 on the stem 21 of the inertia body 2 is a fraction, for example 1/10th, of the forces exerted the spring retainer of the output member on the rear arms of the levers 52.

Upon an acceleration G in excess of a predetermined amount such that a force F equal to the acceleration G times the mass m of the inertia body 2 exceeds the sum of the force f of the set spring 6 and the friction force due to the pressure of the front arms of the levers 54 acting on the rear part of the inertia body 2, the inertia body will move rapidly forward, thereby disengaging the front arms of the levers 54. Both pairs of levers 52 and 54 will be pivoted by the force applied to the levers 52 by the output member 3 in the directions indicated by the arrowed lines in FIG. 4. The output member 3 then is no longer restrained by the latch mechanism against the biasing force of the actuator spring and is driven rapidly forward by the energy stored in the actuator spring 4. The sensor provides an output in the form of movement of the output member under the force of the actuator spring, such output being transmitted to the outside of the sensor by the output member, which may be connected directly or by a cable to the trigger of the pretensioner or to another device.

A sensor embodying the present invention is operated upon a small displacement of an inertia body and, therefore, has a very high response speed. Because the set spring applies a force to the inertia body that is in a direction opposite to that in which it moves in response to acceleration, the possibility of unintended operation due to vibration is reduced, and the sensor, having good anti-vibration properties, can be used in locations in vehicles where other types of sensors cannot.

Sensors embodying the present invention can be designed to produce a large output force and stroke rapidly without requiring a large, heavy inertia body, inasmuch as the movement of the output member is provided by an actuator spring rather than by the inertia body and the inertia body only triggers the release of the output member and does so by only a relatively small displacement. By operating rapidly, the sensor enables the total time required for a pretensioner to tighten a seat belt following a vehicle collision to be reduced.

The use of a latch mechanism based on levers avoids the disadvantages of sensors that use elements that are completely separated from the mechanism or permanently deformed when the sensor operates. Sensors embodying the present invention can easily be reset.

The above-described embodiment of the invention is intended to be merely exemplary, and numerous variations and modifications of it will be readily apparent to those skilled in to art without departing from the spirit and scope of the invention. All such variations and modifications are intended to be included within the scope of the invention as defined in the appended claims.

What is claimed is:

1. A sensor for vehicle seat belt systems comprising a casing, an inertia body having at least a portion received in the casing for displacement axially thereof, an output member received in the casing for displacement axially thereof and having a portion extending out of the casing so that displacement of the output member is transmitted to the outside of the casing, a set spring biasing the inertia body to a set position in the casing, an actuator spring engaged between the casing and the output member and biasing the output member in a direction to displace it along the casing, and latch means for preventing displacement of the output member in the absence of displacement of the inertia body in response to acceleration in excess of a predetermined acceleration, the latch means including a pair of first levers and a pair of second levers, the levers of each pair being pivotally mounted in the casing symmetrically opposite each other and in the set position of the inertia body the pairs of levers being engaged in series between the output member and the inertia body, each first lever having one arm engaged by the output member, and the other arm engaging one arm of one of the second levers and each second lever having its other arm in engagement with the inertia body, whereby when the inertia body is displaced in response to acceleration, the levers are released from series engagement between the output member and the inertia body and the actuator spring displaces the output member.

* * * * *